United States Patent
Mori et al.

(10) Patent No.: US 11,451,457 B2
(45) Date of Patent: Sep. 20, 2022

(54) SENSOR DELAY TIME ESTIMATION DEVICE, SENSOR DELAY TIME ESTIMATION METHOD AND RECORDING MEDIUM

(71) Applicant: KABUSHIKI KAISHA TOYOTA CHUO KENKYUSHO, Nagakute (JP)

(72) Inventors: Daiki Mori, Nagakute (JP); Yoshikazu Hattori, Nagakute (JP); Hideki Sugiura, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 0 days.

(21) Appl. No.: 17/121,075

(22) Filed: Dec. 14, 2020

(65) Prior Publication Data

US 2021/0306243 A1 Sep. 30, 2021

(30) Foreign Application Priority Data

Mar. 30, 2020 (JP) .............................. JP2020-061600

(51) Int. Cl.
*H04L 43/0852* (2022.01)
*H04L 67/12* (2022.01)

(52) U.S. Cl.
CPC .......... *H04L 43/0858* (2013.01); *H04L 67/12* (2013.01)

(58) Field of Classification Search
CPC .. B60W 50/0098; B60W 10/20; B60W 10/18; G01S 17/86; G01S 17/931; G01S 13/865; G01S 13/931; G01S 7/40; G01S 7/497; G01S 7/80; G01R 31/007; B60R 16/0232; B60R 16/0238; G05D 1/0246
See application file for complete search history.

(56) References Cited

U.S. PATENT DOCUMENTS

| | | | |
|---|---|---|---|
| 8,494,716 B1* | 7/2013 | Lee | G05D 1/0246 |
| | | | 701/41 |
| 2019/0344735 A1* | 11/2019 | Granig | G01R 31/007 |
| 2020/0003563 A1 | 1/2020 | Miyake et al. | |
| 2020/0003567 A1 | 1/2020 | Minamiguchi et al. | |
| 2020/0122740 A1* | 4/2020 | Fritzson | B60W 50/0098 |

FOREIGN PATENT DOCUMENTS

| | | |
|---|---|---|
| JP | 2002-350157 A | 12/2002 |
| JP | 2013-170904 A | 9/2013 |
| JP | 2018-155731 A | 10/2018 |

OTHER PUBLICATIONS

Jun. 14, 2022 Office Action issued in Japanese Patent Application No. 2020-061600.

* cited by examiner

*Primary Examiner* — Kyung H Shin
(74) *Attorney, Agent, or Firm* — Oliff PLC (57) ABSTRACT

A sensor delay time estimation device that includes: a memory; and a processor coupled to the memory, wherein the processor is configured to: acquire an observable required to estimate a vehicle state from a plurality of sensors that detect and output the observable, each of the plurality of sensors being different, and based on the observable for a fixed time interval acquired from each of the plurality of sensors, estimate a time delay from detection to acquisition of the observable for each of the plurality of sensors, and estimate a vehicle state for the fixed time interval.

18 Claims, 5 Drawing Sheets

SENSOR DELAY TIME ESTIMATION DEVICE, SENSOR DELAY TIME ESTIMATION METHOD AND RECORDING MEDIUM

CROSS-REFERENCE TO RELATED APPLICATION

This application is based on and claims priority under 35 USC 119 from Japanese Patent Application No. 2020-061600 filed on Mar. 30, 2020, the disclosure of which is incorporated by reference herein.

BACKGROUND

Technical Field

The present disclosure relates to a sensor delay time estimation device, a sensor delay time estimation method and a recording medium recording with a sensor delay time estimation program to estimate a delay time of a sensor.

Background Art

Recently even more sensors are being actively employed in technology to estimate a vehicle's own position in autonomous driving. Imaging devices such as onboard cameras, inertial measurement units (IMU), vehicle speed sensors, and steering angle sensors are now being utilized. However, more recently millimeter wave radar, LIDAR, sonar, and global navigation satellite systems (GNSS) such as global positioning systems (GPS) are becoming common. In the future, the active use of cameras installed on infrastructure is also expected, such as accident prevention/traffic safety cameras and cameras installed to traffic lights, and moreover the active use of data utilizing communication lines for mobile information terminals such as smartphones is also expected.

As the number of sensors employed is increasing in this manner, time management, i.e. management of information by time of the information, is becoming more of an issue. If information from a vehicle traveling at a vehicle speed of 100 km/h (28 m/s) is delayed by 0.1 second, for example, then position information will be different by 28 m/s× 0.1=2.8 m. An error of 2.8 m is a large error, for example, in cases in which an automatic acceleration/deceleration system is being used so as to maintain a fixed vehicle-to-vehicle distance. Although time management is comparatively easily performed for onboard sensors, a large delay arises for sensors such as sensors installed to infrastructure.

In a general method to manage time, an acquisition timing of the sensor information is recorded, and the information is processed with reference to this time information. However, generally onboard computers each have their own clocks, and it is not practical to synchronize timings across all computers including onboard computers and infrastructure computers.

Japanese Patent Application Laid-Open (JP-A) No. 2018-155731 discloses a self-position estimation device integrating each sensor of a GNSS, an onboard camera, and an IMU and estimating a highly accurate position while evaluating the reliability of each sensor.

JP-A No. 2002-350157 discloses a location correcting device that utilizes a relationship between a GPS and speeds from a vehicle wheel speedometer and angular velocimeter to estimate a time delay of the GPS.

However, the technology disclosed in JP-A No. 2018-155731 treats sensor information acquired at each timing as being information of the same timing. The estimation accuracy accordingly deteriorates in cases in which, for example, time is required to convert a GNSS signal into position information.

The technology disclosed in JP-A No. 2002-350157 is able to detect a delay for a sensor outputting speed information other than the GPS. However, sometimes such a delay is not detectable in cases in which, for example, the sensor only outputs position information.

SUMMARY

An aspect of the present disclosure is a sensor delay time estimation device that includes: a memory; and a processor coupled to the memory, wherein the processor is configured to: acquire an observable required to estimate a vehicle state from a plurality of sensors that detect and output the observable, each of the plurality of sensors being different, and based on the observable for a fixed time interval acquired from each of the plurality of sensors, estimate a time delay from detection to acquisition of the observable for each of the plurality of sensors, and estimate a vehicle state for the fixed time interval.

DESCRIPTION OF EMBODIMENTS

Figure 1:
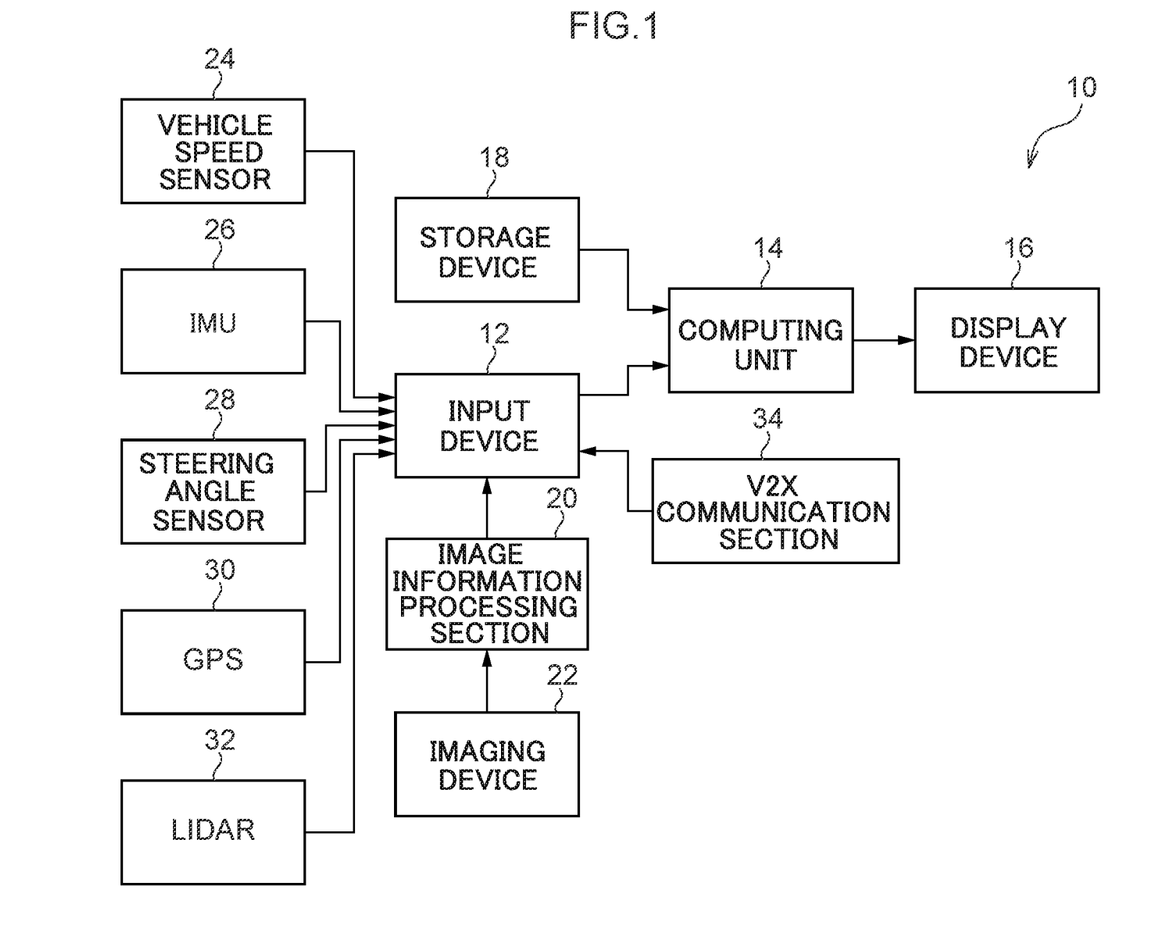
FIG. 1 is a block diagram illustrating an example of a sensor delay time estimation device according to an exemplary embodiment.

Detail explanation follows regarding an exemplary embodiment of the present disclosure, with reference to the drawings. As illustrated in FIG. 1, a sensor delay time estimation device 10 according to the present exemplary embodiment is configured by a storage device 18, an image information processing section 20, an input device 12, a computing unit 14, and a display device 16. Data required for computation by the computing unit 14, described below, and a computation result from the computing unit 14 are stored in the storage device 18. Based on image information acquired by an imaging device 22, the image information processing section 20 computes a relative lateral position of a vehicle with respect to a target route, as well as a yaw angle of the vehicle and the curvature of the target route. The input device 12 is input with a lateral position deviation, yaw angle deviation, and curvature, computed by the image information processing section 20, a vehicle front-rear speed as detected by a vehicle speed sensor 24, a bearing angle deviation and acceleration of the vehicle as detected by an IMU 26, a vehicle steering angle as detected by a steering angle sensor 28, a current position and current yaw angle (bearing angle) of the vehicle as detected by a GPS 30, a current position and current yaw angle of the vehicle as detected by LIDAR 32, and information acquired by wireless communication using a V2X communication section 34. The computing unit 14 is configured by a computer or the like that computes an estimate of the vehicle's own position based on input data input from the input device 12 and data stored in the storage device 18. The display device 16 is configured by a CRT, an LCD, or the like, and displays the vehicle position and so on as computed by the computing unit 14. The computing unit 14 includes an observable prediction section that computes predicted values for observables of the respective sensors while eliminating noise and outliers from the observables of respective sensors. The computing unit 14 also includes a delay time computation section that, based on effects resulting from the motion state of the vehicle and the observables including the predicted values, estimates delay times of the other sensors, and state quantities resulting from the motion state of the vehicle, which are the coordinates indicating the current position of the vehicle, vehicle bearing angle, a vehicle yaw rate R, and the vehicle body lateral speed of the vehicle.

The imaging device 22, serving as an external sensor according to the present exemplary embodiment, is an onboard camera or the like, and, as an example, the imaging device 22 analyses image information of the vehicle surroundings acquired by imaging to detect white lines and the like on the road. Alternatively, a configuration may be adopted in which the coordinates of the current position and the bearing angle of the vehicle are computed by matching between images and a high precision map. As an example, the LIDAR 32 detects white lines and the like on the road using scattered light from a pulse laser (electromagnetic waves) scanning the vehicle surroundings. The sensor delay time estimation device 10 according to the present exemplary embodiment may also include other sensors, such as a millimeter-wave radar or sonar.

Figure 2:
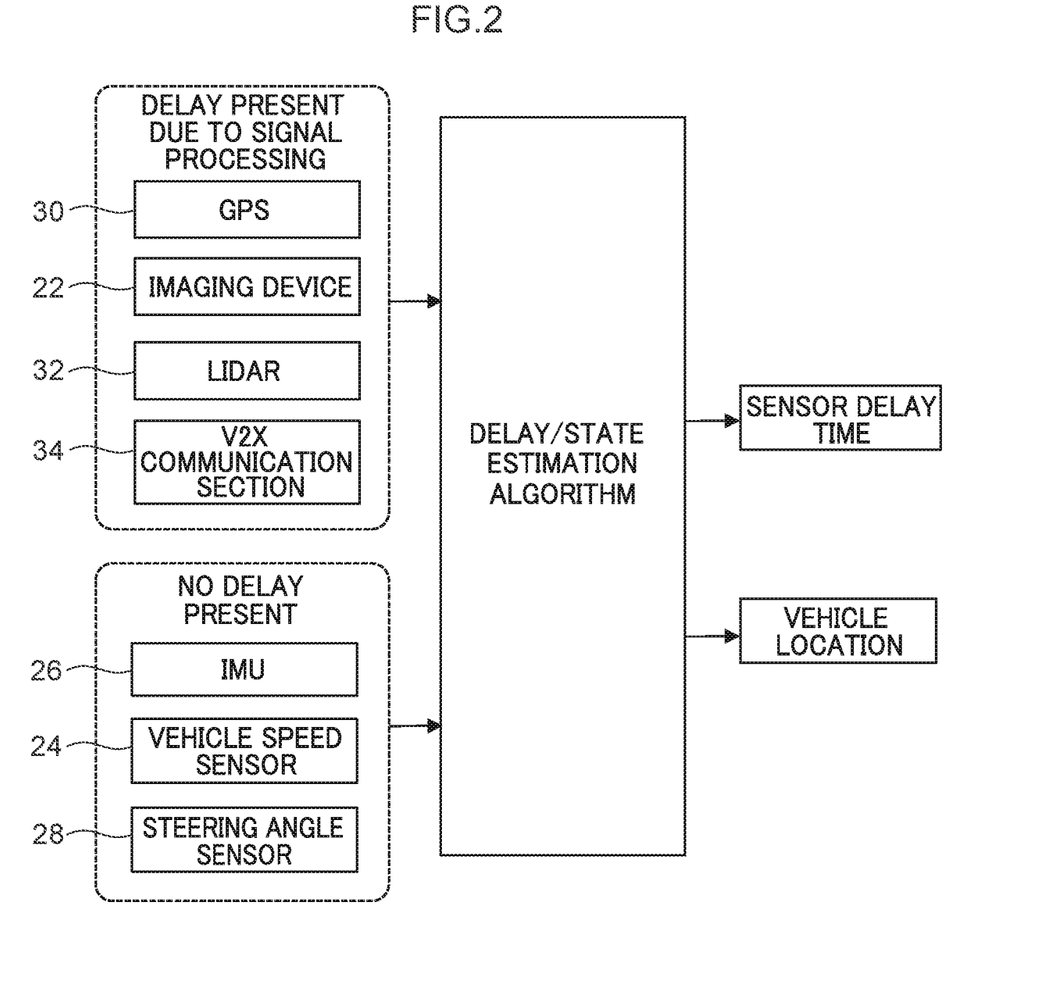
FIG. 2 is a functional block diagram illustrating an example of a delay/state estimation algorithm to estimate a sensor delay time and a vehicle position.

FIG. 2 is a block diagram illustrating an example of a delay/state estimation algorithm for estimating sensor delay time and vehicle position. As illustrated in FIG. 2, a delay due to signal processing is present in the respective sensors, these being the GPS 30, the imaging device 22, the LIDAR 32, and the V2X communication section 34.

However, the delay time is extremely short from the detection of data by the IMU 26, the vehicle speed sensor 24, and the steering angle sensor 28, until acquisition of the data by the computing unit 14. In the present exemplary embodiment, the delay of other sensor information is estimated with respect to the IMU 26, which is generally said to have the shortest delay time. In the present exemplary embodiment, a difference between the delay time of observables in the IMU 26 and the delay time of observables in the other sensors is taken as the delay time for the other sensors. Furthermore, in the present exemplary embodiment, the estimated sensor delay time is utilized to more accurately estimate the vehicle position.

By using the delay/state estimation algorithm illustrated in FIG. 2, the computing unit 14 functions as the observable prediction section to predict the vehicle state, and as a vehicle state estimation section to estimate sensor delay times from observables as output by the sensors and state quantities indicating the motion state of the vehicle.

Figure 6:
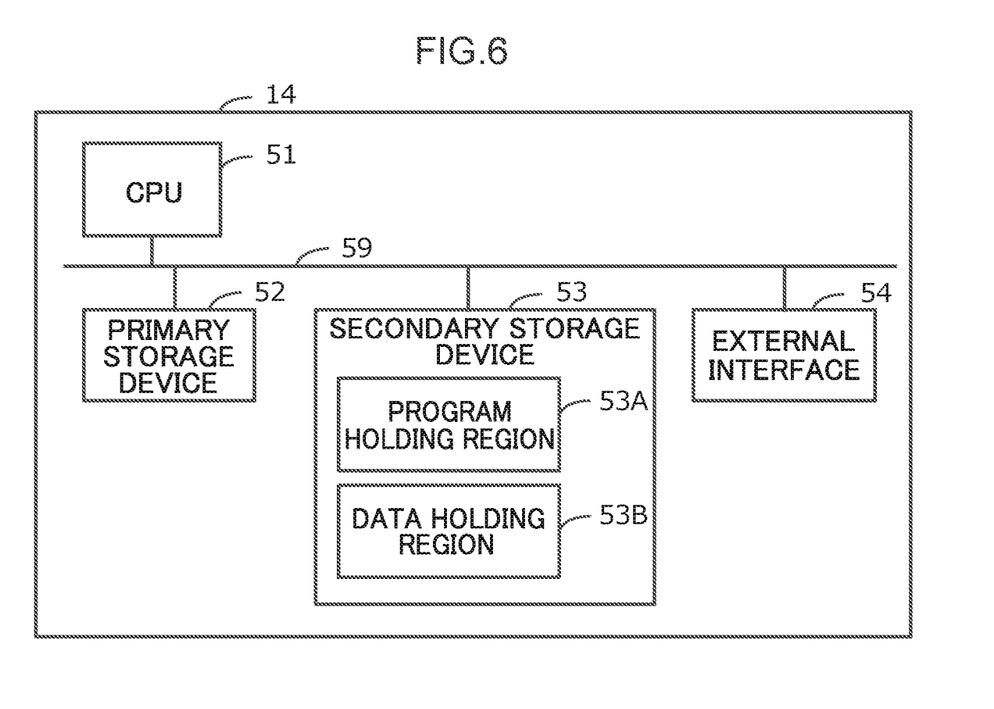
FIG. 6 is a block diagram illustrating an example of a hardware configuration of an arithmetic logic unit.

FIG. 6 illustrates an example of a hardware configuration of the computing unit 14. As illustrated in FIG. 6, as an example the computing unit 14 includes a central processing unit (CPU) 51, a primary storage device 52, a secondary storage device 53, and an external interface 54.

The CPU 51 is an example of a processor, this being hardware. The CPU 51, the primary storage device 52, the secondary storage device 53, and the external interface 54 are connected together through a bus 59. The CPU 51 may be configured by a single processor, or by plural processors. Alternatively, a graphics processing unit (GPU) or the like may, for example, be employed instead of the CPU 51.

The primary storage device 52 is volatile memory such as random access memory (RAM) or the like. The secondary storage device 53 is non-volatile memory such as a hard disk drive (HDD), a solid state drive (SSD), or the like.

The secondary storage device 53 includes a program holding region 53A and a data holding region 53B. As an example, the program holding region 53A is stored with a program such as a sensor delay time estimation program. The data holding region 53B may for example function as a temporary storage device to temporarily store intermediate data generated by execution of the sensor delay time estimation program.

The CPU 51 reads the sensor delay time estimation program from the program holding region 53A and expands this program in the primary storage device 52. The CPU 51 performs sensor delay time estimation by loading and executing the sensor delay time estimation program.

The sensor delay time estimation program can be recorded in a non-transitory recording medium such us a hard disc drive, a solid state drive and the like. The sensor delay time estimation program can be read from the non-transitory recording medium by using a recording medium reading device and can be loaded in the program holding region 53A.

An external device is connected to the external interface 54. The external interface 54 serves to exchange various information between the external device and the CPU 51. The input device 12, the storage device 18, and the display device 16 are, for example, connected to the external interface 54.

Figure 3:
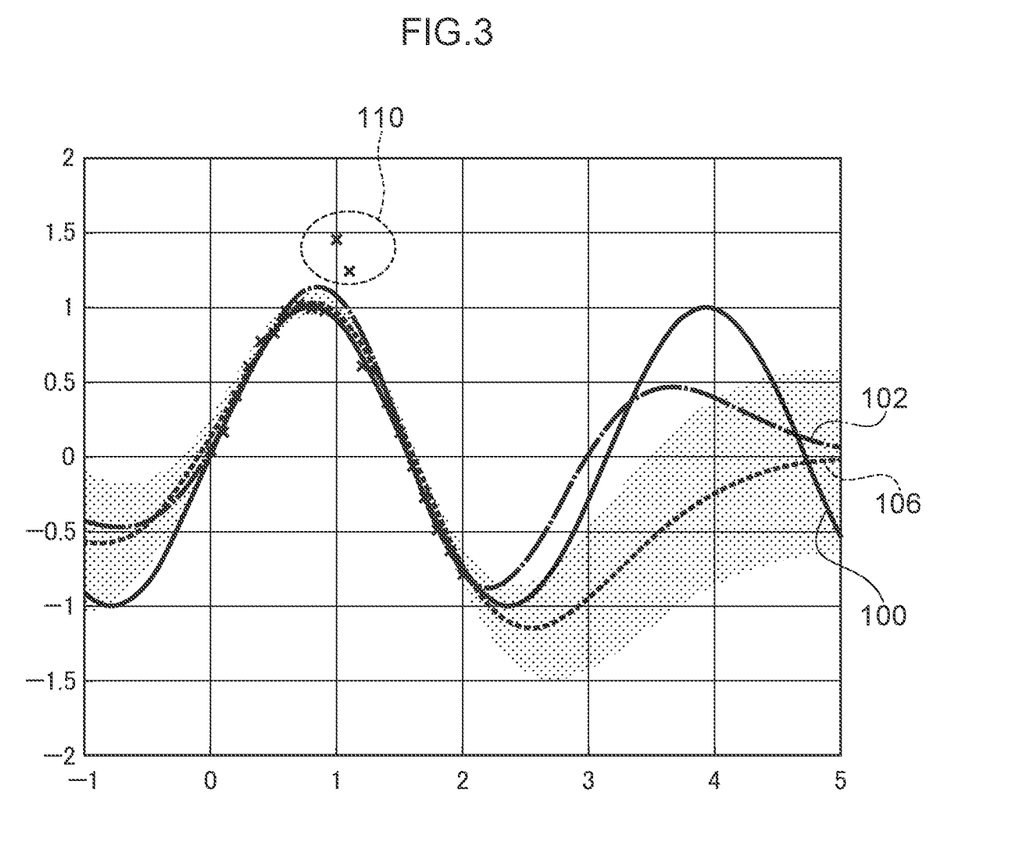
FIG. 3 is an explanatory diagram to explain an example of discrete output values output by a sensor, and an example of a case in which discrete output values are interpolated using Gaussian process regression and Student-t process regression.

Explanation follows regarding the delay/state estimation algorithm according to the present exemplary embodiment. Signals (data) output by sensors are generally discrete. The marks X in FIG. 3 are examples of data output by a given sensor. Some of the data are outliers 110. In the present exemplary embodiment, the outliers 110 and abnormal values thought to be sensor noise are remove in advance from a population of normal data. As illustrated in FIG. 3, the data output by the sensor is discrete and non-continuous data, and so differentiation is not able to be performed thereon. In the present exemplary embodiment, the data output by the sensors are interpolated to give continuous values so as to enable differentiation to be performed thereon.

A method such as linear interpolation or spline interpolation is generally employed as the method of data interpolation. In such interpolation methods, a detailed hypothesis needs to be set in advance, such as deciding polynomials in relationships between the data. There is accordingly a need, for example, to set each setting in the interpolation method after having ascertained the characteristics of the sensor information. However, as more and more diverse types of sensor information are now being employed, performing settings in this manner is no longer practical.

The present exemplary embodiment employs a method called Gaussian process regression that is able interpolated data and make data predictions by considering the interrelation of data to time. In Gaussian process regression, the interrelation between data and time is generally determined as a Gaussian distribution, and this accordingly enables discrete data to be interpolated into continuous data by a probabilistic approach.

Explanation follows regarding a data interpolation method employing Gaussian process regression. In Gaussian process regression, for given data (t, y), the following function, called a Kernel function, is defined for interpolating and predicting data t'. In the following equation, $a_1$, $a_2$ are constants that may be determined by adjusting values appropriately using trial and error, or may be estimated based on output values of the Kernel function.

$$k(t, t') = a_1 \exp\left(-\frac{|t - t'|^2}{a_2}\right)$$

A Kernel matrix with the following elements is defined using the above Kernel function.

$$K_{nn'} = k(t_n, t_n')$$

Three types of the above Kernel matrix are prepared in the following manner.
(1) A Kernel matrix K (t, t) expressing interrelations within the given data (output by the sensor).
(2) A Kernel matrix K (t, t') expressing interrelations between the given data and interpolated data.
(3) A Kernel matrix K (t', t') expressing interrelations between data in the interpolated data.

A mean value of y' can be calculated from these Kernel matrices in the following manner.

$$\bar{y}' = f_{av}(t') = K(t, t')^T K(t, t)^{-1} (y - \bar{y}) + \bar{y}$$

The variances of the given data and the interpolated data satisfy the following equation.

$$\text{var}(y') = f_{var}(t') = K(t', t') - K(t, t')^T K(t, t)^{-1} K(t, t')$$

FIG. 3 illustrates a true value curve 100 as would be expected if the given data were to be continuous, a Gaussian process regression curve 102 according to the present exemplary embodiment, and for reference, a Student-t process regression curve 105 capable of expressing data with heavier tails than with a Gaussian process. As illustrated in FIG. 3, each of the functions is a continuous function input with t'. Since these are continuous functions, not only is it possible to interpolate and predict discrete data, differentiation is also possible thereon. Furthermore, the Kernel function is able to perform more robust interpolation for the outliers 110 by using Student-t process regression.

Next, explanation follows regarding sensor delay time and vehicle state estimation. In the present exemplary embodiment, a method called moving horizon estimation (MHE) is employed to estimate a vehicle state by optimization calculation using the sensor information (data) within a fixed time frame and motion constraints based on a vehicle motion equation.

This method can be applied to compute delays or periodic differences in sensor information using past data for a fixed time frame. Moreover, performing sequential nonlinear optimization calculation enables the estimation of constraint conditions for a nonlinear vehicle state and nonlinear observation conditions, as well as enabling the estimation of delays in sensor information.

Figure 4:
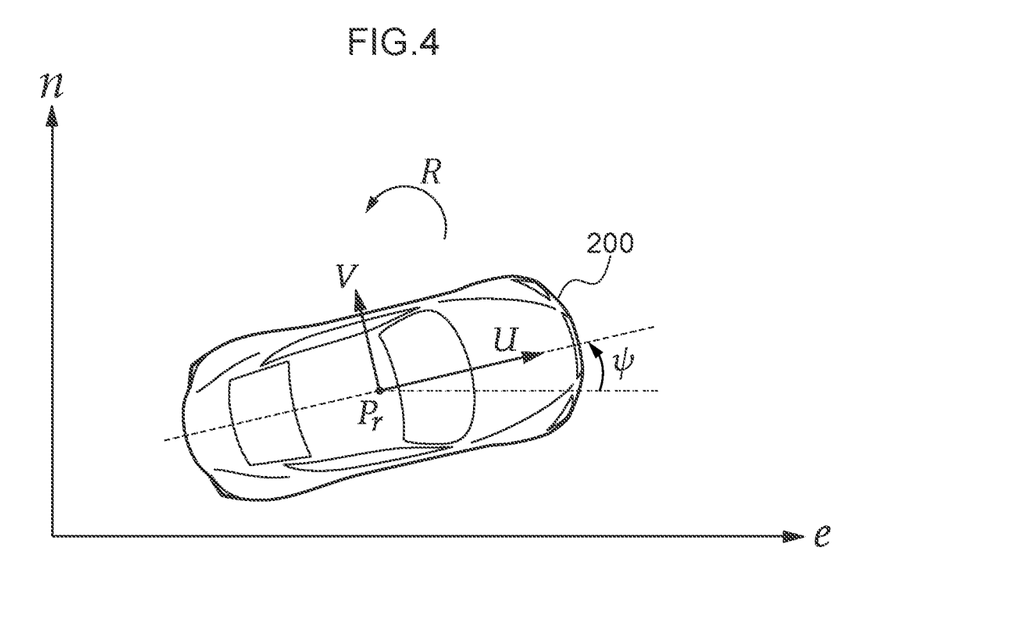
FIG. 4 is an explanatory diagram illustrating a coordinate system and definitions of state quantity variables in an equation of state and an observation equation.

An equation of state and an observation equation are established based on a vehicle motion equation that uses MHE. FIG. 4 is an explanatory diagram illustrating a coordinate system and definitions of state quantity variables in the established equation of state and observation equation. The coordinate system is expressed in terms of latitude n and longitude e. The state quantity variables to express the motion state of a vehicle 200 are latitude n and longitude e for the coordinates indicating the current position of the vehicle 200, a bearing angle ψ, a yaw rate R, and a vehicle body lateral speed V.

$$x = [e\, n\, \psi\, R\, V]$$

Input values to the equation of state are defined in the following manner. The input values are a vehicle speed (vehicle front-rear speed) U detected by the vehicle speed sensor 24 and assumed to have no delay, and a steering angle δ detected by the steering angle sensor 28 and similarly also assumed to have no delay.

Thus, in the equation of state $f_s$ (x, u) the following holds. In the following equations, $l_f$ is the distance from a vehicle center of gravity $P_r$ to the front wheels, $l_r$ is the distance from the center of gravity $P_r$ to the rear wheels, $K_f$ is a cornering stiffness of the front wheels, $K_r$ is a cornering stiffness of the rear wheels, and $I_z$ is a moment of inertia for yaw rotation.

$$\frac{de}{dt} = U \cos\psi - V \sin\psi + v_e$$

$$\frac{dn}{dt} = U \sin\psi - V \cos\psi + v_n$$

$$\frac{d\psi}{dt} = R + v_\psi$$

$$\frac{dR}{dt} = -\frac{2l_f K_f - 2l_r K_r}{I_z U} V - \frac{2l_f^2 K_f + 2l_r^2 K_r}{I_z U} R + \frac{2l_f K_f}{I_z}\delta + v_R$$

$$\frac{dV}{dt} = -\frac{2K_f + 2K_r}{mU} V - \left(U + \frac{2l_f K_f + 2l_r K_r}{I_z U}\right) R + \frac{2K_f}{m}\delta + v_V$$

In the equations of state, system noise $Q_n$ is defined as follows.

$$Q_n = [v_e\, v_n\, v_\psi\, v_R\, v_V]$$

The observable variables to be employed in the observation equation are defined as follows. Namely, the observable variables are latitude n', longitude e', bearing angle ω', yaw rate R', and lateral acceleration $A_y'$. Of these observable variables, the latitude n' and the longitude e' are acquired from the imaging device 22, the GPS 30, or the like for which a delay is assumed to be present, whereas the bearing angle ψ', the yaw rate R', and the lateral acceleration $A_y'$ are acquired from the IMU 26 which no delay is assumed to be present.

$$y = [e'\, n'\, \psi'\, R'\, A_y']$$

Thus, in the observation equation $y = f_o$ (x, u) the following holds.

$$e' = e + \omega_e$$

$$n' = n + \omega_n$$

$$\psi' = \psi + \omega_\psi$$

$$R' = R + \omega_R$$

$$A_y = \frac{dV}{dt} + RU + \omega_{A_y}$$

In the observation equation, observation noise $R_n$ is defined as follows.

$$R_n = [\omega_e \omega_n \omega_\psi \omega_R \omega_{A_y}]$$

Figure 5:
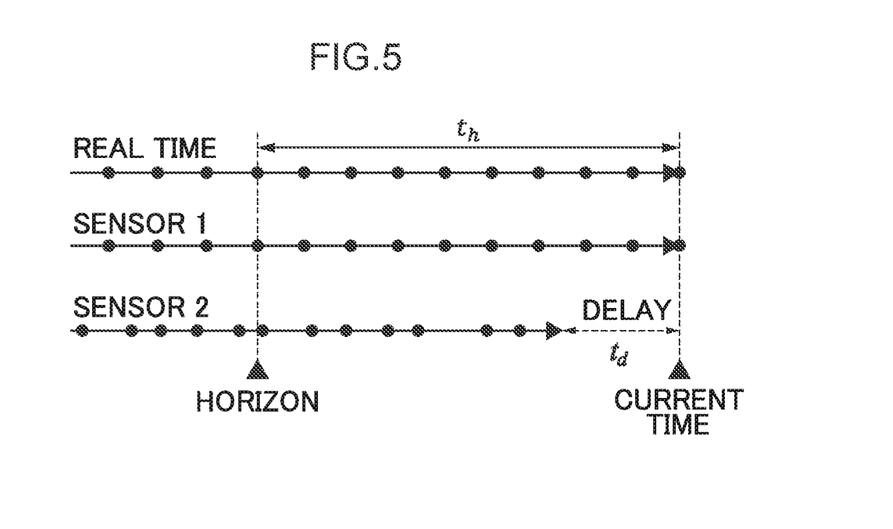
FIG. 5 is a schematic diagram illustrating moving horizon estimation (MHE) operation.

Next, explanation follows regarding a method of estimating the sensor delay time using MHE. FIG. 5 is a schematic diagram illustrating the operation of MHE. As illustrated in FIG. 5, MHE uses an algorithm to accurately estimate a current state using information regarding a time $t_h$ spanning from the current time back to a fixed time in the past, called a horizon. The time $t_h$ spanning from the horizon to the current time may be any desired value, and is set to approximately several seconds as an example.

FIG. 5 also serves as an information detection log, for a sensor 1 such as the IMU 26 for which the delay time does not need to be considered, and for a sensor 2 such as the imaging device 22 for which the delay time does need to be considered. In FIG. 5, each of the dots on the axis of real time indicates a timing for computation of the delay time and vehicle's own position, and this axis of real time indicates elapsed time. The dots for the sensor 1 and the sensor 2 each indicate a timing when sensor data was received. The information from sensor 1 does not incur a delay with respect to real time, and so the latest information is the current information. However, the information from sensor 2 is delayed with respect to real time when received by a computing unit (electronic control unit (ECU)) of the vehicle performing autonomous driving and the like. The latest value of the information from sensor 2 is information in the past from the current time by a delay time $t_d$. In cases in which the sensor 2 is the imaging device 22, a signal output from the imaging device 22 is information that needs a high degree of post-processing such as image processing to be performed in later stage processing, giving rise to the delay time $t_d$ from the point in time the imaging device 22 outputs the signal, until when this signal is acquired as sensor information capable of being recognized by the arithmetic logic unit of the vehicle. The delay time $t_d$ may also arise from a delay time in communication between the sensor 2 and the arithmetic logic unit.

The delay time $t_d$ may also arise in cases in which the clock of the sensor 2 and the clock of the arithmetic logic unit of the vehicle are not synchronized, and is caused by a discrepancy between the actual time of output of a signal to indicate that the sensor 2 had detected an object and the time of sensor information (this discrepancy is referred to in general as "discretization error due to computation cycle asynchronicity"). In cases in which a delay time $t_d$ arises, there is no information for the interval of delay time $t_d$, giving rise to a drop in estimation accuracy. The information within the delay time $t_d$ is interpolated with high accuracy by utilizing the Gaussian process regression described above on the delay time $t_d$, and minimizing the discretization error due to computation cycle asynchronicity.

In FIG. 5, as an example, the sensor 2 is presumed to be the imaging device 22, however similar estimation may be performed for other sensors, such as the LIDAR 32 or the like.

In MHE, an argument X that satisfies the following is computed by sequential optimization calculation for a given time interval $t_n$ to $t_{n+h}$.

$$X = \underset{x, t_d}{\operatorname{argmin}} \left\{ \frac{1}{2} \|x_n - \tilde{x}_n\|^2_{P_n} + \frac{1}{2} \sum_{i=n}^{n+h} \|x_{i+1} - f_s'(x_i, u_i)\|^2_{Q_n} + \right.$$

Equation (1)

$$\left. \frac{1}{2} \sum_{i=n}^{n+h} \|f_{av}(t_i + t_d) - f_o(x_i, u_i)\|^2_{R_n} \right\}$$

Denotations adopted in the above equation have the following meanings:

$\underset{A}{\operatorname{argmin}} B(A)$: Return argument $A$ to minimize $B(A)$.

$\|A\|^2_B = A * B^{-1} * A$ $x_n$: initial state quantity of time interval
$\hat{x}_n$: estimated state quantity
$P_n$: covariance matrix of state quantity $x_n$ In the above equation, $t_d$ is a delay time of a camera sensor with respect to the IMU 26, for example, and to estimate delay time $t_d$, and different sensors are treated as having a separate variable for delay time $t_d$. For example, positions and bearings obtained from sensor information output by a camera sensor have the same delay time, and sensor information from another sensor, such as the LIDAR 32, has a different delay time.

The first term in the above equation is a term called arrival cost, and is a cost expressing a deviation between an initial state quantity of the time interval and an estimated state quantity. The second term expresses a cost for a constraint (constraint on vehicle motion) of state quantity $x_{i+1}$ from equation of state ($f_s'(x_i, u_i)$). The final third term considers the delay time and expresses a cost (deviation) at time $t_i + t_d$ (i=n to n+h) with respect to a relationship between an observable ($f_{av}(t_i + t_d)$) and an observable ($f_o(x_i + u_i)$) computed from the observation equation. The first term and the second term in the above equation indicate effects related to an amount of change in the state quantity, and the third term in the above equation indicates deviation between observables including predicted values from Gaussian process regression, and observables computed from state quantities.

A characteristic of MHE is the feature that the delay time $t_d$ in observables in the third term in the above equation is also subjected to optimization. Hitherto the time of the observable has been treated as known, giving rise to a fall in accuracy when time delays occur. In the present exemplary embodiment, the delay time $t_d$ can be estimated by converting the discrete observables into a continuous function using Gaussian process regression. A Student-t process regression may also be employed instead of a Gaussian process regression to convert the discrete output values into a continuous function. Employing a Student-t process regression instead of a Gaussian process regression enables robust interpolation and prediction of sensor value data even when outliers 110 are contained therein.

A Gauss-Newton method tailored to minimize the square error of the non-linear function of the right hand side of above Equation (1) may, for example, be employed as a method employed in actual optimization calculation. The above equation can be simplified in the following manner by combining a state variable $x_n$ on the time axis and a time delay variable $t_d$ into a single vector X as described above, and by furthermore using a diagonal matrix W of the variances for each variable (noise values for each variable defined in the equation of state and the observation equation).

$$X = \underset{X}{\mathrm{argmin}} \|L(X)\|_W^2$$

Solving the above enables computation of the argument X including the state quantity $x_n$ and the delay time $t_d$.

$$X_{m+1} = X_m + \Delta X$$

More specifically, based on the interrelationship between time and vehicle state, and based on the observable of a reference sensor, from out of plural sensors, that has the minimum delay time from detection to acquisition of observable, the computing unit 14 employs the equation of state to compute a predicted value of a vehicle state at the next timing.

The computing unit 14 estimates the vehicle state and delay times of other sensors according to Equation (1) in a fixed time interval, based on errors in the predicted values of the vehicle state and the deviation between the observables of plural sensors considering delay time and the observables of plural sensors computed from the state quantities.

For example, argument X is updated by predicting the state quantities using the equation of state, and by repeatedly estimating the above state quantities and delay times at each timing so as to find an optimized solution. Note that the method to compute $\Delta X$ differs depending on the optimization theory.

For example, a Gauss-Newton method is a method to find an optimized solution by iterative calculation. However, real-time characteristics are maintained by not repeating iterations at each timing until convergence is achieved, and by instead stopping at a single iteration. Alternatively a similar algorithm such as a Levenberg-Marquardt algorithm or dynamic programing may also be employed.

As described above, the sensor delay time estimation device 10 according to the present exemplary embodiment enables delay times of information from other sensors to be estimated with respect to the IMU 26, which is generally thought of as having the smallest delay. Furthermore, vehicle position estimation can thereby be made at higher accuracy based on the estimated sensor delay time.

In the present exemplary embodiment, utilizing the interrelation of sensor information to time in a given fixed time interval enables the interpolation of sensor information that was acquired at discrete timings, and also enables the prediction of sensor information not yet acquired due to delay.

A general estimation method to perform sequential estimation, as typified by a Kalman filter or a particle filter, suffers from the defect of treating the latest information all as information from the same timing. In the present exemplary embodiment, past data is held for a fixed period of time, and enabling correspondence to delay information by utilizing all of this sensor information when performing estimation of the state of the vehicle 200 with MHE. Although general approaches mainly treat delay times as known, in the present algorithm the delay times are also treated as unknown variables and estimated. Employing delay times in this manner enables high accuracy application to also be made to cases in which delay times are unknown information.

An objective of the present disclosure is to realize a sensor delay time estimation device, a sensor delay time estimation method and a recording medium recording with a sensor delay time estimation program to estimate a delay time of a sensor and to estimate a vehicle state at high accuracy.

A first aspect of the present disclosure is a sensor delay time estimation device, that includes: a memory; and a processor coupled to the memory, wherein the processor is configured to: acquire an observable required to estimate a vehicle state from a plurality of sensors that detect and output the observable, each of the plurality of sensors being different, and based on the observable for a fixed time interval acquired from each of the plurality of sensors, estimate a time delay from detection to acquisition of the observable for each of the plurality of sensors, and estimate a vehicle state for the fixed time interval.

A second aspect of the present disclosure is the sensor delay time estimation device of the first aspect, wherein the delay time arises from at least one of: a post processing time of sensor output values detected by the sensor, a communication delay time from the sensor to the processor, or asynchronization of circuit clocks in the sensor and in the processor.

A third aspect of the present disclosure is the sensor delay time estimation device of the first or the second aspect, wherein the processor is configured to compute a predicted value of a state quantity indicating a vehicle state at a next timing, based on an interrelationship between time and the vehicle state and based on the observable of a reference sensor that, among the plurality of sensors, has a minimum value for the delay time from detection to acquisition of the observed value.

A fourth aspect of the present disclosure is the sensor delay time estimation device of the third aspect, wherein the processor is configured to estimate the vehicle state and a delay time of a sensor other than the reference sensor, based on a deviation between the observables of the plurality of sensors taking into account an error in a predicted value of the vehicle state and the delay time in the fixed time interval, and the observables of the plurality of sensors computed from the state quantity.

A fifth aspect of the present disclosure is the sensor delay time estimation device of the fourth aspect, wherein the delay time is a delay time of the sensor other than the reference sensor that is based on the delay time of the reference sensor that, among the plurality of sensors, has the minimum value for the delay time from detection to acquisition of observable.

A sixth aspect of the present disclosure is the sensor delay time estimation device of any of the third to the fifth aspect, wherein the state quantity includes coordinates indicating a current vehicle location, a bearing angle of the vehicle, a yaw rate of the vehicle, and a vehicle body lateral speed of the vehicle.

A seventh aspect of the present disclosure is the sensor delay time estimation device of the sixth aspect, wherein the observable includes coordinates indicating a current vehicle location, a bearing angle of the vehicle, a yaw rate of the vehicle, and a vehicle body lateral acceleration of the vehicle.

The sensor delay time estimation device of the first to the seventh aspect can be realized in forms of a method or a program recorded in a recording medium.

The present disclosure enables estimation of a delay time of a sensors, and enables a vehicle state to be estimated with high accuracy.

The invention claimed is:

1. A sensor delay time estimation device, comprising:
a memory; and
a processor coupled to the memory, wherein the processor is configured to:
acquire a plurality of observables from a plurality of sensors, each of the plurality of sensors being different, and each of the plurality of sensors detecting and outputting a respective observable from among the plurality of observables, and
estimate, based on the observables for a period of time, a time delay from detection to acquisition of observables other than one reference observable for the period of time,
wherein the reference observable is output by a reference sensor of the plurality of sensors, the reference sensor having a minimum delay time from detection to acquisition of its respective observable with respect to other sensors from among the plurality of sensors.

2. The sensor delay time estimation device of claim 1, wherein the processor is configured to compute a predicted value of a state quantity indicating a vehicle state at a next timing, based on an interrelationship between time and the vehicle state and based on the observable of the reference sensor.

3. The sensor delay time estimation device of claim 2, wherein the processor is configured to estimate the vehicle state and a delay time of a sensor other than the reference sensor, based on a deviation between the observables of the plurality of sensors taking into account an error in a predicted value of the vehicle state and the delay time in the period of time, and the observables of the plurality of sensors computed from the state quantity.

4. The sensor delay time estimation device of claim 1, wherein the reference sensor is an inertial measurement unit (IMU).

5. The sensor delay time estimation device of claim 1, wherein data output by the plurality of sensors is discrete and non-continuous, and the processor is configured to interpolate the discrete and non-continuous data to generate continuous data.

6. The sensor delay time estimation device of claim 5, wherein the processor is configured to interpolate the discrete and non-continuous data by using a Gaussian process regression.

7. A sensor delay time estimation method, comprising:
acquiring a plurality of observables from a plurality of sensors, each of the plurality of sensors being different, and each of the plurality of sensors detecting and outputting a respective observable from among the plurality of observables; and
estimating, based on the observables for a period of time, a time delay from detection to acquisition of observables other than one reference observable for the period of time,
wherein the reference observable is output by a reference sensor of the plurality of sensors, the reference sensor having a minimum delay time from detection to acquisition of its respective observable with respect to other sensors from among the plurality of sensors.

8. The sensor delay time estimation method of claim 7, further comprising
computing a predicted value of a state quantity indicating a vehicle state at a next timing, based on an interrelationship between time and the vehicle state and based on the observable of the reference sensor.

9. The sensor delay time estimation method of claim 8, further comprising estimating the vehicle state and a delay time of a sensor other than the reference sensor, based on a deviation between the observables of the plurality of sensors taking into account an error in a predicted value of the vehicle state and the delay time in the period of time, and the observables of the plurality of sensors computed from the state quantity.

10. The sensor delay time estimation method of claim 7, wherein the reference sensor is an inertial measurement unit (IMU).

11. The sensor delay time estimation method of claim 7, wherein data output by the plurality of sensors is discrete and non-continuous, and the method further comprises interpolating the discrete and non-continuous data to generate continuous data.

12. The sensor delay time estimation method of claim 11, further comprising interpolating the discrete and non-continuous data by using a Gaussian process regression.

13. A non-transitory recording medium that records a program that is executable by a computer to perform a sensor delay time estimation processing, the sensor delay time estimation processing comprising:
acquiring a plurality of observables from a plurality of sensors, each of the plurality of sensors being different, and each of the plurality of sensors detecting and outputting a respective observable from among the plurality of observables; and
estimating, based on the observables for a period of time, a time delay from detection to acquisition of observables other than one reference observable for the period of time,
wherein the reference observable is output by a reference sensor of the plurality of sensors, the reference sensor having a minimum delay time from detection to acquisition of its respective observable with respect to other sensors from among the plurality of sensors.

14. The non-transitory recording medium of claim 13, wherein the sensor delay time estimation processing further includes
computing a predicted value of a state quantity indicating a vehicle state at a next timing, based on an interrelationship between time and the vehicle state and based on the observable of the reference sensor.

15. The non-transitory recording medium of claim 14, wherein the sensor delay time estimation processing further includes
estimating the vehicle state and a delay time of a sensor other than the reference sensor, based on a deviation between the observables of the plurality of sensors taking into account an error in a predicted value of the vehicle state and the delay time in the period of time, and the observables of the plurality of sensors computed from the state quantity.

16. The non-transitory recording medium of claim 13, wherein the reference sensor is an inertial measurement unit (IMU).

17. The non-transitory recording medium of claim 13, wherein data output by the plurality of sensors is discrete and non-continuous, and the processing further comprises interpolating the discrete and non-continuous data to generate continuous data.

18. The non-transitory recording medium of claim 17, further comprising interpolating the discrete and non-continuous data by using a Gaussian process regression.

* * * * *